(12) United States Patent
Pasolini et al.

(10) Patent No.: US 8,749,491 B2
(45) Date of Patent: *Jun. 10, 2014

(54) USER CONTROLLED DEVICE FOR SENDING CONTROL SIGNALS TO AN ELECTRIC APPLIANCE, IN PARTICULAR USER CONTROLLED POINTING DEVICE SUCH AS MOUSE OR JOYSTICK, WITH 3D-MOTION DETECTION

(75) Inventors: Fabio Pasolini, S. Martino Siccomario (IT); Paolo Bendiscioli, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,851

(22) Filed: Feb. 23, 2012

(65) Prior Publication Data

US 2012/0154275 A1 Jun. 21, 2012

Related U.S. Application Data

(63) Continuation of application No. 10/685,292, filed on Oct. 14, 2003, now Pat. No. 8,139,031.

(30) Foreign Application Priority Data

Oct. 14, 2002 (EP) .................................... 02425626

(51) Int. Cl.
  *G09G 5/08* (2006.01)
(52) U.S. Cl.
  USPC ......................................... 345/163; 345/158
(58) Field of Classification Search
  CPC ........ G06F 3/011; G06F 3/033; G06F 3/0346

USPC .................................................. 345/156–169
See application file for complete search history.

(56) References Cited

U.S. PATENT DOCUMENTS

| 4,565,999 A | 1/1986 | King et al. |
| 4,682,159 A | 7/1987 | Davison |

(Continued)

FOREIGN PATENT DOCUMENTS

| EP | 0166432 A2 | 1/1986 |
| EP | 0901064 A2 | 3/1999 |
| WO | 01/90877 A1 | 11/2001 |
| WO | 02/37827 A2 | 5/2002 |

OTHER PUBLICATIONS

Hinckley et al., "The VideoMouse: A Camera-Based Multi-Degree-of-Freedom Input Device," *Proceedings of the ACM UIST '99 Symposium on User Interface Software & Technology, CHI Letters* 1(1):103-112, 1999.

(Continued)

*Primary Examiner* — Regina Liang
(74) *Attorney, Agent, or Firm* — Seed IP Law Group PLLC

(57) ABSTRACT

A user controlled device, movable into a plurality of positions of a three-dimensional space, includes a MEMS acceleration sensor to detect 3D movements of the user controlled device. The device, such as a mouse, sends control signals correlated to the detected positions to an electrical appliance, such as a computer system. A microcontroller processes the output signals of the MEMS acceleration sensor to generate the control signals, such as screen pointer position signals and "clicking" functions.

19 Claims, 4 Drawing Sheets

(56) References Cited

U.S. PATENT DOCUMENTS

| | | |
|---|---|---|
| 4,787,051 A | 11/1988 | Olson |
| 5,181,181 A | 1/1993 | Glynn |
| 5,615,132 A | 3/1997 | Horton et al. |
| 5,638,092 A | 6/1997 | Eng et al. |
| 5,701,131 A | 12/1997 | Kuga |
| 5,703,623 A | 12/1997 | Hall et al. |
| 6,130,664 A | 10/2000 | Suzuki |
| 6,249,274 B1 | 6/2001 | Svancarek et al. |
| 6,573,883 B1 | 6/2003 | Bartlett |
| 6,765,553 B1 | 7/2004 | Odamura |
| 6,834,249 B2 | 12/2004 | Orchard |
| 6,933,933 B2 | 8/2005 | Fleming |
| 8,139,031 B2 * | 3/2012 | Calarco et al. ............... 345/163 |
| 2001/0055951 A1 | 12/2001 | Slotznick |
| 2002/0065626 A1 | 5/2002 | McCall et al. |
| 2004/0066371 A1 | 4/2004 | Huang |

OTHER PUBLICATIONS

Lee et al., "Two-Dimensional Position Detection System with MEMS Accelerometer for MOUSE Applications," *Proceedings of the Design Automation Conference* 38:852-857, Jun. 18, 2001.

* cited by examiner

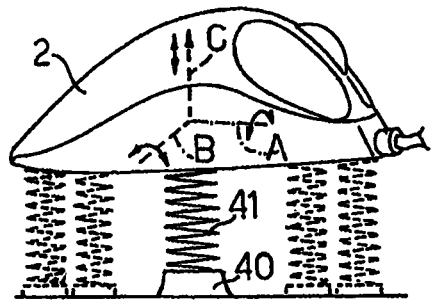
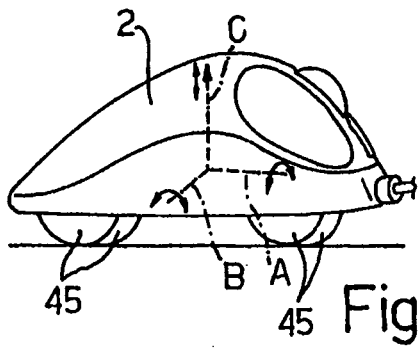
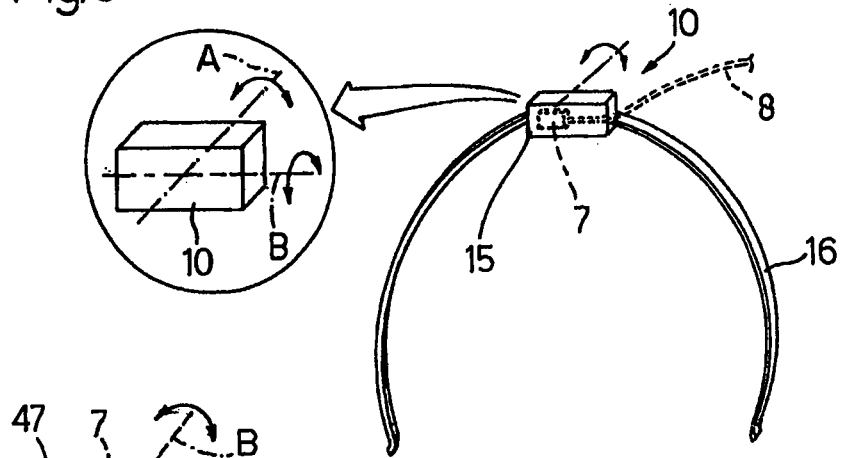
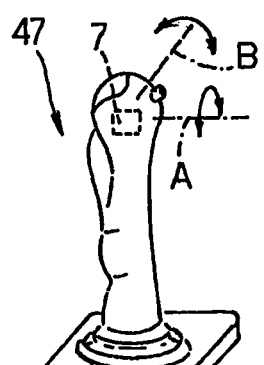
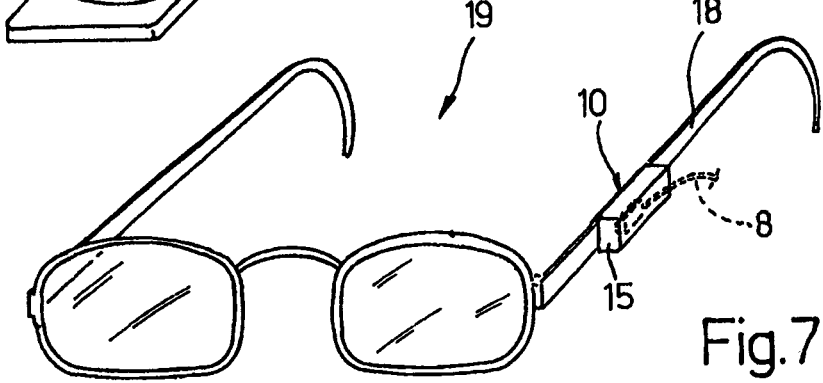

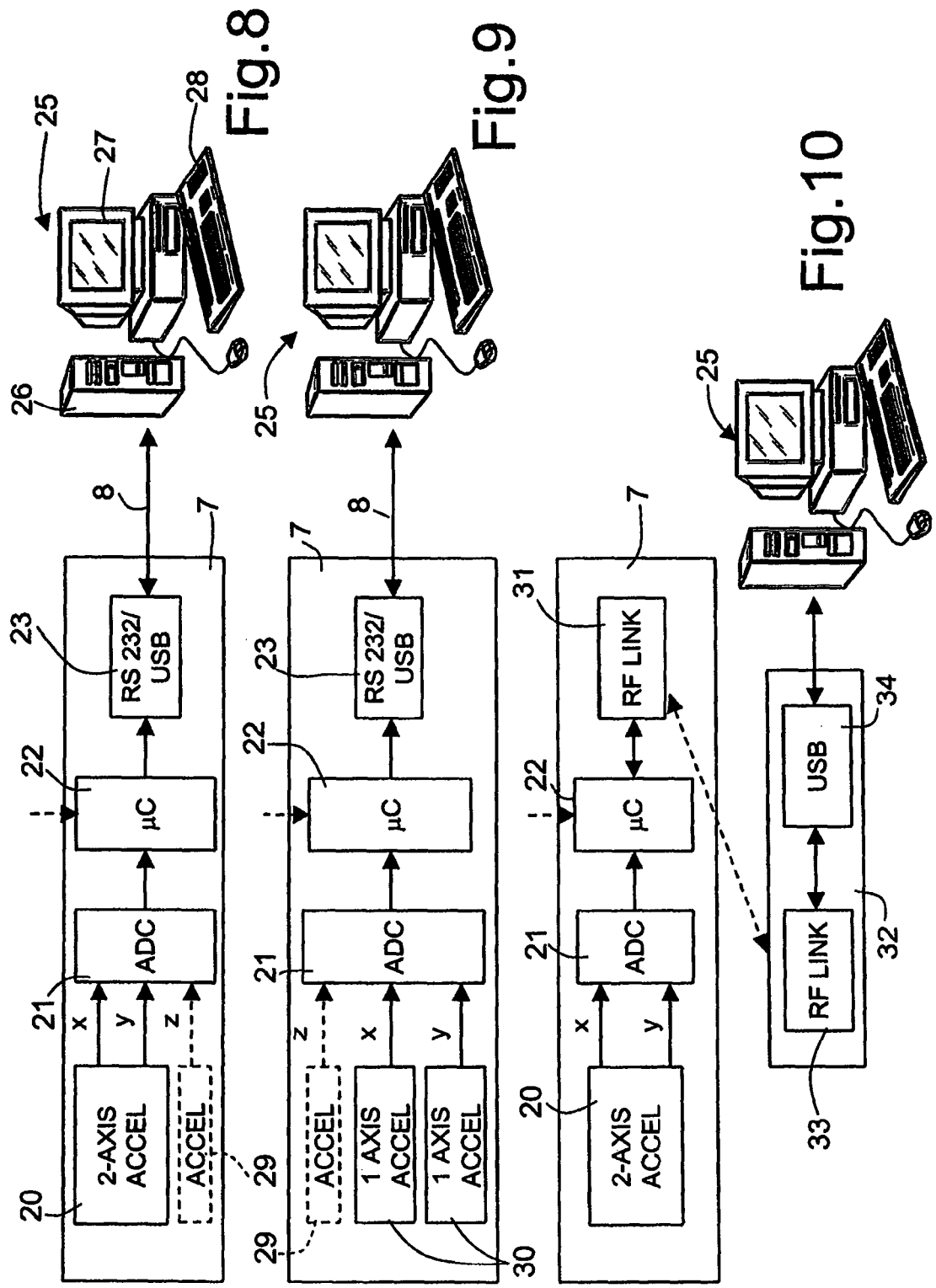

USER CONTROLLED DEVICE FOR SENDING CONTROL SIGNALS TO AN ELECTRIC APPLIANCE, IN PARTICULAR USER CONTROLLED POINTING DEVICE SUCH AS MOUSE OR JOYSTICK, WITH 3D-MOTION DETECTION

BACKGROUND OF THE INVENTION

1. Field of the Invention

The present invention relates to a user-controlled device, in particular a mouse or a joystick, with 3D motion detection. The invention is however also applicable to game pads, trackballs and other screen pointing devices for a computer system as well as to devices for pointing or selecting predetermined tasks or information according to their position, which are connected to a computer or a computer-controlled system. The invention is also applicable to the control of an electrical appliance, e.g., for switching on an electrical appliance and activate particular tasks, on the base of a 3D movement signal generated by the user-controlled device.

2. Description of the Related Art

As is known, mice are now the most common interface between a person and a computer or a computer controlled device and are hand-displaced on a plane or two-dimensional surface to control a cursor or pointer or activate particular tasks. To this end, typical mice comprise a plurality of sensors detecting a 2D movement of the mouse; a plurality of buttons for entering commands and a communication interface for communication with the computer system.

In view of the ease of operation and spread in use of mice as a convenient interface with computer systems, a number of functionalities are being developed to make mice still easier to use, to reduce operation stresses and damages to arms and shoulders, to increase the number of tasks that may be controlled or selected through a mouse, to adapt to various specific requirement and operation environment or to detect movements with more degrees of freedom.

For example, a mouse has been proposed, having improved movement detection capabilities, including detection of tilting in four different directions, rotation about its axis and a little vertical movement. This mouse, described, e.g., in "The VideoMouse: A Camera-Based Multi-Degree-of-Freedom Input Device," by K. Hinckley et al., ACM UIST'99 Symposium on User Interface Software & Technology, *CHI Letters* 1 (1), pp. 103-112, uses a video camera for detecting the movement. However, although the image processing systems are becoming cheaper and smaller, the costs and dimensions of these systems do not allow their use in all systems. Furthermore, this type of movement detection has a functionality highly dependent upon light conditions and/or optical features of the surface the mouse rests on.

Furthermore, the known solutions do not always allow operation by disabled persons, having limited or no hand control.

BRIEF SUMMARY OF THE INVENTION

An embodiment of the invention improves a user controlled device of the indicated type, so as to allow a wider applicability.

According to various embodiments of the present invention, there is provided a user controlled device, and a method for generating control signals.

According to an aspect of the invention, the user controlled device accommodates an accelerometer or acceleration sensor made with the MEMS (MicroElectroMechanicalSystem) technology and able to detect 3D movements, in particular movements around two perpendicular axes, so as to sense the movement of the user controlled device in the space and send corresponding control signals to an electrical appliance, e.g., a computer system.

According to a first embodiment, the user controlled device is similar to a conventional mouse with buttons, wheels and click possibilities, but instead of being configured so as to be displaceable in a plane, has a support allowing tilting of the device around two perpendicular axes. The support may allow a vertical displacement of the device body.

According to another embodiment, the user-controlled device is an aid device for disabled individuals, in particular for persons having a reduced residual mobility and can, e.g., only move the head. The control device has a housing accommodating a dual-axis MEMS accelerometer operating as an inclinometer; the housing is worn by the person and fixed to a mobile limb or head. For example, the housing may be similar to the housings used for hearing aids, and may be supported in the eyeglass arm, or be fixed to the head through a hairband.

According to another aspect of the invention, the control device is connected through a wire or in a wireless way to the computer system.

BRIEF DESCRIPTION OF THE SEVERAL VIEWS OF THE DRAWINGS

For the understanding of the present invention, preferred embodiments thereof are now described, purely as a non-limitative examples, with reference to the enclosed drawings, wherein:

FIG. 3 shows a perspective view of a second embodiment of the present control device;

FIG. 4 shows a perspective view of a third embodiment of the control device;

FIG. 5 shows a perspective view of a fourth embodiment of the control device;

FIG. 6 shows a perspective view of a fifth embodiment of the control device;

FIG. 7 shows a perspective view of a sixth embodiment of the control device;

FIG. 8 is a block diagram of the pointing device of FIGS. 1-7;

FIG. 9 is a different block diagram of the control device of FIGS. 1-7;

FIG. 10 is another block diagram of the control device of FIGS. 1-7.

DETAILED DESCRIPTION OF THE INVENTION

Figure 1:
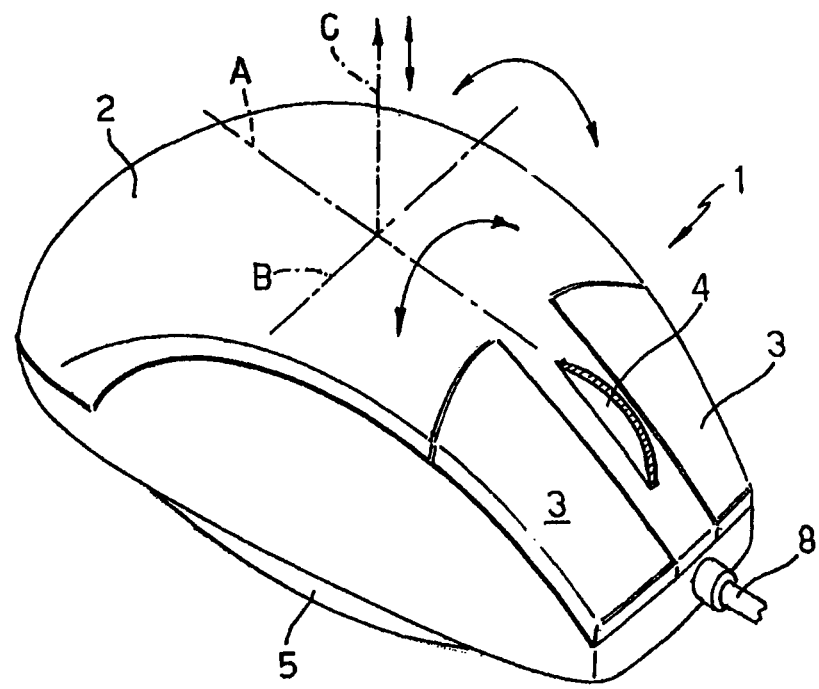
FIG. 1 shows a perspective view of a first embodiment of the present control device.
Figure 2:
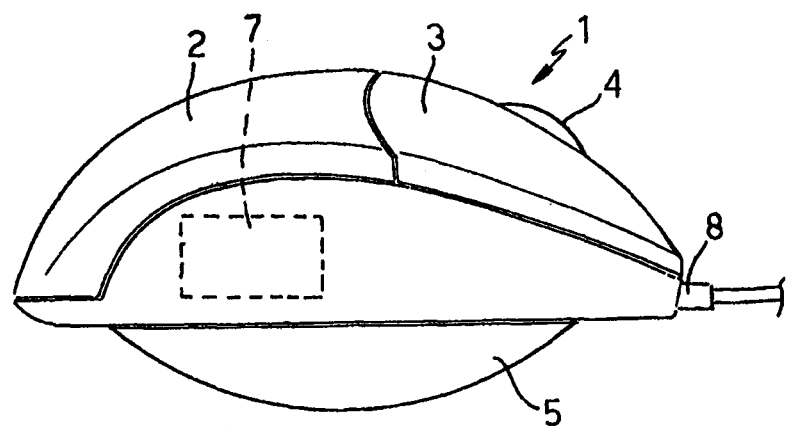
FIG. 2 is a lateral view of the pointing device of FIG. 1.

FIG. 1 shows a first embodiment of the present control device, in the shape of a mouse 1. The mouse 1 comprises a body 2 of rounded shape having two buttons 3 and a central wheel 4 operable by the user, in a per se known manner. In the alternative, a middle button may be provided instead of the wheel.

The body 2 is supported by a curved base 5 preferably in the shape of a spherical cap arranged with the convexity looking downwards, so as to allow tilting of the body 2 around two axes A and B, perpendicular to each other and to a vertical axis C. The curved base 5 may be of rigid or resilient material (e.g., rubber), to allow a vertical displacement of the body 2.

The body 2 accommodates the usual control circuitry (not shown), for detecting actuation of the buttons 3 ("clicking") and rotation of the wheel 4 in a per se known manner and sending suitable signals to a computer system (see FIGS. 7-9). Furthermore, the body 2 accommodates a 3D-motion detection device 7 (the block diagram whereof is shown in FIGS. 7-9) based on a MEMS accelerometer detecting the acceleration and movement of the body, in particular the tilting of the body 2 around axes A and B and in case vertical displacement along the axis C and sending corresponding information or control signals toward the computer system. The transmission circuitry may be in common with the usual button and wheel control circuitry.

In the shown embodiment, an electrical wire 8 connects the mouse 1 with the computer system; in the alternative and in a per se known manner, the mouse 1 may be connected wireless (e.g., by optical or radio transmission) to the computer system.

The mouse 1 is designed to be balanced and to rest in an horizontal position in the absence of external forces and to tilt around axis B (up-down movement of the front portion bearing the buttons 3 and the wheel 4) and/or around axis A (left-right movement) under the pressure of a user's hand. The 3D-motion detection device 7 (as discussed in detail with reference to FIGS. 7-9) detects the tilting and in case the vertical displacement and generates corresponding signals to control an arrow on a screen of the computer system. In particular, the left-right mouse movement (around axis A) may cause a corresponding left-right movement of an arrow on the screen; the up-down mouse movement (around axis B) may cause a corresponding up and down movement on the screen; the vertical movement may control further functions, for example for handling more folders on the screen or performing other pre-programmed dedicated tasks.

FIG. 3 shows a different embodiment, wherein the body 2 is supported by a suction cap 40 and a spring 41 is interposed between the suction cap 40 and the body 2. By virtue of the spring 41, the body 2 may be tilted around axes A and B and be displaced along axis C, and a 3D-motion detection device (not shown) arranged inside the body 2 sends corresponding control signals to a computer system. In the alternative, more springs, e.g., four springs, may be provided for a better tilting control, as schematically represented by dashed lines.

FIG. 4 shows another embodiment, wherein the body 2 is supported by four balls 45, e.g., of rubber. Also here, the body 2 may perform a tilting movement around axes A, B and vertical displacement along vertical axis C, and a 3D-motion detection device (not shown) arranged inside the body 2 sends corresponding control signals to a computer system.

FIG. 5 shows another embodiment, wherein the control device is a joystick 47, having usual buttons for function control and accommodating a 3D-motion detection device 7.

FIGS. 6 and 7 show different embodiments specifically intended for disabled persons. In this case, a pointing device 10 includes a housing 15 fixedly attached to an article worn by the user.

In FIG. 6, the housing 15 is attached to a hairband 16 and accommodates the 3D-motion detection device 7, shown with dashed lines; the pointing device may be connected to the computer system through a wire 8 or, preferably, in a wireless way.

In FIG. 7, the housing 15 is attached to an arm 18 of a pair of glasses 19.

In both cases, tilting of the head of a user up-down and/or left-right causes tilting of the pointing device around axes A, B, as visible in the enlarged detail of FIG. 6, and sending of corresponding signals to the computer system, analogously to the embodiments of FIGS. 1-5. In addition, the pointing device 10 may be designed to associate specific movements of the housing 15 to "click" functions, as below described in greater detail with reference to the flow-chart of FIG. 11.

A first embodiment of the 3D-motion detection device 7 is shown in FIG. 8. Here, the 3D-motion detection device 7 includes a 2-axis accelerometer 20 manufactured in the MEMS technology, for example as described in European patent application N. 02425320.5 filed on 21.5.2002. Accelerometer 20 generates two output signals X, Y proportional to the tilting angle of the mouse 1 or of the pointing device 10 around axes A, B. Output signals X, Y are digitized in an analog-to-digital converter 21 and fed to a microcontroller 22. Microcontroller 22 may also receive further control signals, such as "clicking" signals from the buttons 3 and position signals from the wheel 4 in the embodiments of FIGS. 1-5, as indicated with dashed line.

The 3D-motion detection device 7 also includes a communication port 23, for example, an RS 232 or USB port for signal exchange between the microcontroller 22 and a computer 25 including, i.e., a central unit 26, a screen 27 and a keyboard 28.

In case of the mouse 1 or the pointing device 10 allow vertical displacement, a further accelerometer 29 may be provided to send a corresponding signal to AD converter 21 and microcontroller 22, as shown in dashed line.

FIG. 9 shows a second embodiment of the 3D-motion detection device 7 comprising, instead of a 2-axis accelerometer, two 1-axis accelerometers 30 and, in case, a vertical axis accelerometer 29, all manufactured in the MEMS technology. For example, the accelerometer described in U.S. application Ser. No. 10/128,133 filed on Apr. 23, 2002 or the accelerometer described in U.S. Pat. No. 5,955,668 may be used. In this case, the accelerometers 30 are arranged so that one accelerometer 30 detects tilting around axis A and the other accelerometer 30 detects tilting around axis B, while accelerometer 29 detect displacement along axis C, and generate respective output signals X, Y and Z.

FIG. 10 shows a third embodiment including a 2-axis accelerometer 20 as in FIG. 8, but communication with the computer 25 is accomplished through a radio-frequency link (e.g., using the Bluetooth technology). Here, the microcontroller 22 is connected with an RF transmitter/receiver 31 which, through antennas not shown, communicates with an interface 32 including an analogous RF transmitter/receiver 33 and a digital port 34, e.g., an RS 232 or USB port, in turn connected with the computer 25.

In the case of the mouse 1, the 3D-motion detection device 7 detects the tilting movements of the body 2 and controls the position of an arrow or other pointer on the screen 27 on the basis of the output signals X and Y fed by the 2-axis accelerometer 20 or the 1-axis accelerometers 30 in a manner analogous to conventional mice.

In case of vertical displacement, signal Z may be used according to the pre-programmed task.

In case of the pointing device 10, as said, the microcontroller 22 may control not only the shifting of an arrow on the screen 27, but also "clicking" functions, based, e.g., on the variation speed, i.e., the rate of change, of the output signals X, Y fed by the accelerometer(s) 20, 30. Conveniently, the microcontroller 22 is able to discriminate among unintentional small movements (e.g., tremors) of the user's head, intentional movements of bigger entity for pointer position control and rapid head movements for "clicking."

To this end, the microcontroller compares the entity of the detected movements (difference between the current and previous output signals X and Y, fed by the accelerometer) with a click threshold to detect a clicking movement, and, if a clicking movement is not detected, the microcontroller compares the signals X and Y with respective thresholds THX and THY to detect arrow control movements.

In particular, when an arrow control movement is detected (slow movement of the head), the signs of the signals indicate the direction (up, down, left, right) of the arrow movement with a speed which is a function of the amplitude of the signals. When instead a clicking function is detected, the sign of the derivative of one output signal indicates simple clicking of the left or of the right button, and the sign of the derivative of the other output signal indicates continuous pressure of the left button or interruption of the continuous pressure, as below described in detail.

The thresholds may be programmed by the user in a setup phase of the pointing device 10, as well as the functions associated with slow or rapid movement.

Figure 11:
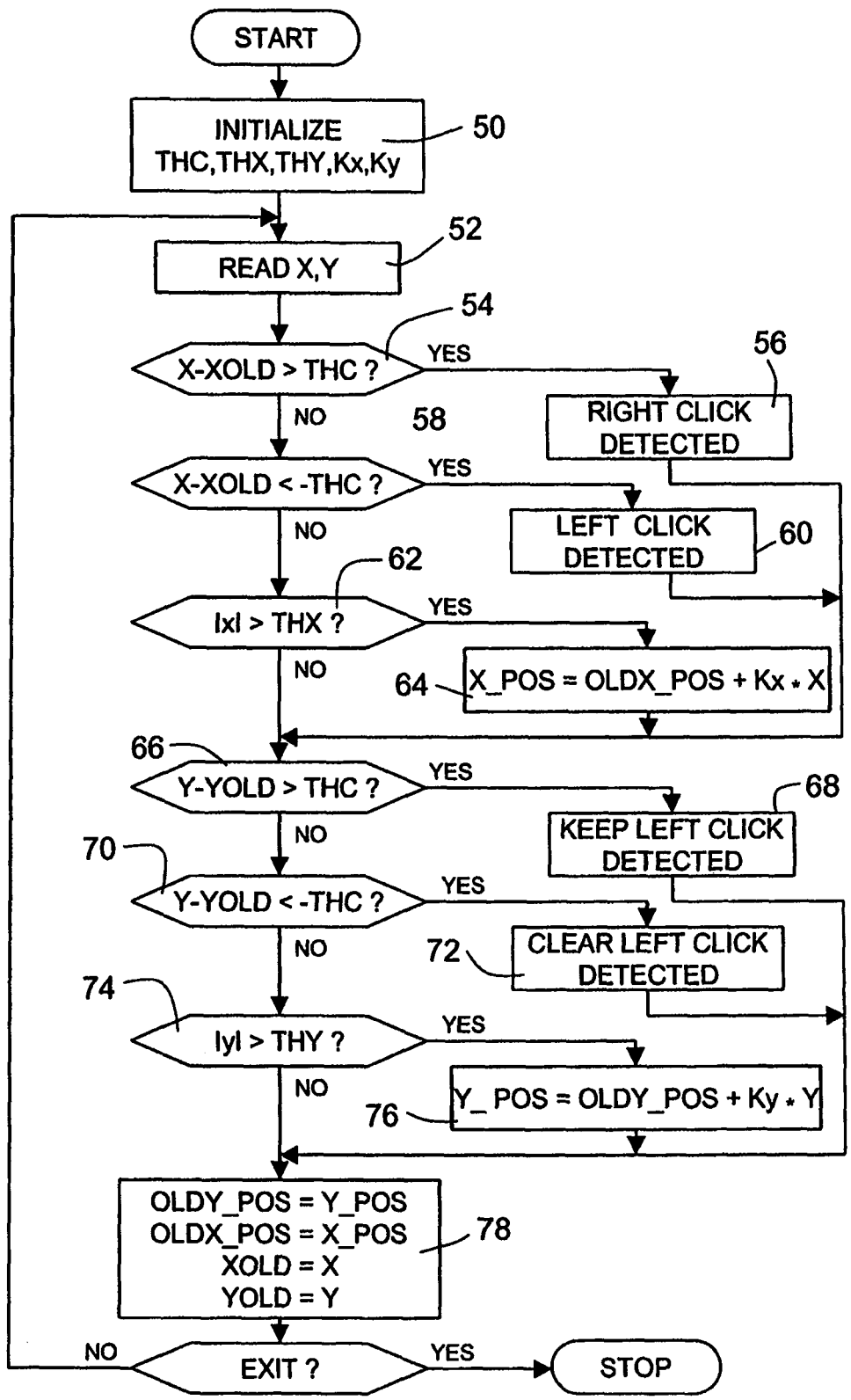
FIG. 11 is flow-chart of the operation of the pointing device of FIG. 6 or 7.

A flow-chart of the control program of the microcontroller 22 for the embodiments of FIG. 6, 7 is shown in FIG. 11.

Initially, step 50, thresholds THC, THX, THY, and constants Kx, Ky are initialized. Threshold THC represents the clicking threshold, that is the minimum derivative in absolute value for controlling a clicking function; THX represents the X-signal threshold, that is the minimum signal in absolute value for recognizing a valid movement along the X axis and THY represents the Y-signal threshold, that is the minimum signal in absolute value for recognizing a valid movement along the Y axis. Kx and Ky represent the desired movement speed.

Then, the (digitized) output signals X and Y from the accelerometer(s) 20, 30 are read, step 52; the entity of the movement in the X direction is calculated as the difference between the output signal X and a previous value XOLD, and represents the amount of change of position in the X direction since the previous value XOLD was read. The resulting value is compared with positive clicking threshold THC, step 54. If the difference X-XOLD is higher than the positive clicking threshold THC, indicating a rate of change that exceeds the threshold THC, a right click (corresponding to clicking of the right button in a conventional mouse) is detected and a corresponding signal is sent to the computer system, step 56; otherwise the difference X-XOLD is compared with the negative clicking threshold −THC, step 58. If the difference X-XOLD is lower than the negative clicking threshold −THC, a left click (corresponding to clicking of the left button in a conventional mouse) is detected and a corresponding signal is sent to the computer system, step 60.

If the difference X-XOLD is higher than negative clicking threshold −THC but lower than positive clicking threshold THC, output NO from step 58, the absolute value of the signal X is compared with X-signal threshold THX to discriminate between an unintentional small movement and a control movement, step 62. If the absolute value of the signal X is higher than X-signal threshold THX, a new position X_POS of the mouse on the screen is calculated by adding a quantity Kx*X, proportional to the detected output signal X, to the previous position OLDX_POS and a corresponding signal is sent to the computer system, step 64.

If the absolute value of the signal X is lower than the X-signal threshold THX (output NO from step 62), as well as after detecting a clicking function (after steps 56, 60) and after calculating the new position X_POS (after step 64), the variation of the output signal Y is checked, analogously to what has been described for the X signal. Thus, the entity of the movement in the Y direction is calculated as the difference between the output signal Y and a previous value YOLD and compared with positive clicking threshold THC, step 66. If the difference Y-YOLD is higher than the positive clicking threshold THC, a command analogous to the continuous pressure of the left button in a conventional mouse is detected and a corresponding signal is sent to the computer system, step 68; otherwise the difference Y-YOLD is compared with the negative clicking threshold −THC, step 70. If the difference Y-YOLD is lower than the negative clicking threshold −THC, a release command of the left button is detected and a corresponding signal is sent to the computer system, step 72.

If the difference Y-YOLD is higher than negative clicking threshold −THC but lower than positive clicking threshold THC, output NO from step 70, the absolute value of the signal Y is compared with Y-signal threshold THY, step 74. If the absolute value of the signal Y is higher than Y-signal threshold THY, a new position Y_POS of the mouse on the screen is calculated by adding a quantity Ky*Y, proportional to the detected output signal Y, to a previous position value OLDY_POS and a corresponding signal is sent to the computer system, step 76.

If the signal Y is lower than the Y-signal threshold THY (output NO from step 74), as well as after detecting a continuous clicking or clicking release function (after steps 68, 72) and after calculating the new position Y_POS (after step 76), the previous values XOLD, YOLD, OLDX_POS and OLDY_POS are updated with the current values X, Y, X_POS and Y_POS, step 78.

The cycle continues until the pointing device is switched off.

The advantages of the present invention are clear from the above. In particular, it is outlined that the detection of a 3D movement by way of an MEMS accelerometer causes the control device to be very versatile as regards application, features and operativity. In particular, the control device may be implemented as a mouse, joystick, trackball, control pad or other control device for a screen cursor or for selection among a number of alternatives presented on a screen or other display. The device may be implemented to allow a simple actuation, also by persons having reduced movement capabilities; and additional control may be implemented by a same control device.

Furthermore, the implementation as a mouse requires an actuation space smaller than with actual mice, since no planar movement on a resting surface is required. Furthermore, no mouse pad is needed, and the present pointing device may be actuated on top of any surface, independently from the texture or optical properties thereof.

The control device with 3D-movement detection by MEMS accelerometers manufactured using semiconductor technologies is cheaper than other prior solutions.

The device may be used to control actuation of different operations or tasks of an electrical appliance, which is very advantageous for disabled persons or in case that the user should require the hands free for other activities.

Finally, it is clear that numerous variations and modifications may be made to pointing, selection or, generally, control device described and illustrated herein, all falling within the scope of the invention as defined in the attached claims.

In particular, the pointing, selection or control device may be implemented in any support, such as any mouse, joystick, gamepad, PDA (personal digital assistant, allowing Web surfing, e-mail exchange and so on), mobile phone, that is 3D-movable or has a 3D-movable portion.

Furthermore, the shape of the support allowing tilting of the device body may vary; for example, in the embodiment of FIG. 4, the yieldable balls may be replaced by rigid balls connected to the body 2 through elastic means.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A system comprising:
    a pointing device;
    a sensor coupled to the pointing device and configured to detect movements, including acceleration, of the pointing device, the pointing device configured to transmit a first movement signal and a second movement signal each indicative of the movements of the pointing device; and
    a processor coupled to the sensor to receive the first and second movement signals, the processor configured to receive the wireless movement signals, to process the wireless signals, to calculate a difference between the first movement signal and the second movement signal, to calculate an acceleration of the pointing device based on the difference of the first and second movement signals, and to output movement tracking signals when an acceleration of the pointing device is smaller than an acceleration threshold, and to output a specific command signal when the acceleration of the pointing device is greater than the acceleration threshold.

2. The system of claim 1 wherein the processor is configured to output video signals to a display screen, the video signals configured to display an object that moves according to the tracking signals.

3. The system of claim 1 wherein the object is a cursor.

4. The system of claim 1 wherein the object is an arrow pointer.

5. The system of claim 1 comprising a memory coupled to the processor, the memory configured to store software instructions, the processor configured to output tracking signals and the specific command according to the software instructions.

6. The system of claim 1 wherein the pointing device is configured to be coupled to a hand of a user.

7. The device of claim 6 wherein the pointing device communicates wirelessly with the processor.

8. The device of claim 1 wherein the pointing device includes a microcontroller coupled to the inertial sensor.

9. The device of claim 1 wherein the microcontroller digitizes analog inertial sensor signals received from the inertial sensor to produce the movement signals.

10. A method comprising:
    generating movement signals in a sensor coupled to a pointing device, the movement signals being indicative of movements, including acceleration, of the pointing device;
    transmitting the movement signals to a processor;
    calculating, in the processor, a difference between a first one of the movement signals and a second one of the movement signals;
    calculating, in the processor, an acceleration of the pointing device based on the difference;
    generating a tracking signal in the processor, the tracking signal being configured to cause an object on a display screen to move based on movement of the pointing device when an acceleration of the pointing device is lower than an acceleration threshold; and
    generating an action signal in the processor that is an action different from moving the object on the display screen when the acceleration of the pointing device is greater than the acceleration threshold.

11. The method of claim 10 comprising digitizing the movement signals in a microcontroller prior to transmitting the movement signals to the processor.

12. The method of claim 10 comprising reading software instructions from a memory coupled to the processor, the software indicating a magnitude of the acceleration threshold and the specific action to be performed when the acceleration of the pointing device is greater than the movement threshold.

13. The method of claim 10 wherein the processor is configured to read software loaded by a user of the pointing device.

14. The method of claim 10 wherein the pointing device is configured to be attached to a limb of a user.

15. A system comprising:
    a pointing device;
    an accelerometer coupled to the pointing device and configured to output movement signals indicative of movements, including acceleration, of the pointing device; and
    a computer configured to receive the movement signals, to calculate a difference between a first one of the movement signals and a second one of the movement signals, to cause an object on a display to move according to the movements of the pointing device when an acceleration of the pointing device is lower than a first threshold and to execute a specific command when the acceleration of the pointing device is higher than the acceleration threshold.

16. The system of claim 15 wherein the pointing device communicates wirelessly with the computer.

17. The system of claim 15 comprising a microprocessor coupled to the pointing device and configured to receive the movement signals, to process the movement signals, and to transmit the movement signals to the computer.

18. The system of claim 15 wherein the object is a cursor.

19. The system of claim 15 wherein the object is an arrow pointer.

* * * * *